(12) United States Patent
Sato et al.

(10) Patent No.: US 7,466,116 B2
(45) Date of Patent: Dec. 16, 2008

(54) CURRENT SENSING CIRCUIT FOR A MULTI-PHASE DC-DC CONVERTER

(75) Inventors: Tetsuo Sato, San Jose, CA (US); Nobuyoshi Matsuura, Gunma-ken (JP)

(73) Assignee: Renesas Technology America, Inc., San Jose, CA (US)

( * ) Notice: Subject to any disclaimer, the term of this patent is extended or adjusted under 35 U.S.C. 154(b) by 255 days.

(21) Appl. No.: 11/044,950

(22) Filed: Jan. 26, 2005

(65) Prior Publication Data
US 2005/0225307 A1   Oct. 13, 2005

Related U.S. Application Data (60) Provisional application No. 60/561,655, filed on Apr. 12, 2004.

(51) Int. Cl.
*G05F 1/40* (2006.01)
(52) U.S. Cl. .................................................. 323/285
(58) Field of Classification Search ................ 323/282, 323/283, 284, 285, 289, 351
See application file for complete search history.

(56) References Cited

U.S. PATENT DOCUMENTS

| | | | |
|---|---|---|---|
| 5,723,974 A | 3/1998 | Gray | |
| 5,982,160 A | 11/1999 | Walters et al. | |
| 6,151,233 A | 11/2000 | Kondo | |
| 6,215,290 B1 * | 4/2001 | Yang et al. ................... | 323/282 |
| 6,246,220 B1 | 6/2001 | Isham et al. | |
| 6,414,470 B1 | 7/2002 | Liu et al. | |
| 6,424,129 B1 | 7/2002 | Lethellier | |
| 6,449,174 B1 | 9/2002 | Elbanhawy | |
| 6,727,745 B2 | 4/2004 | Shearon et al. | |
| 6,765,372 B2 | 7/2004 | Isham | |
| 6,806,689 B2 | 10/2004 | Schuellein et al. | |
| 6,861,830 B1 | 3/2005 | Tzeng et al. | |
| 6,871,289 B2 * | 3/2005 | Pullen et al. ................. | 713/300 |
| 6,940,189 B2 * | 9/2005 | Gizara ......................... | 307/151 |
| 7,092,265 B2 * | 8/2006 | Kernahan .................... | 363/65 |
| 7,132,820 B2 * | 11/2006 | Walters et al. .............. | 323/288 |
| 2002/0044458 A1 | 4/2002 | Elbanhawy | |
| 2003/0201761 A1 | 10/2003 | Harris | |
| 2003/0214274 A1 | 11/2003 | Lethellier | |

(Continued)

OTHER PUBLICATIONS

Greg J. Miller et al., "Switchmode DC-DC Converter Family Using HIP6006 and HIP6007 PWM Controller ICs," Intersil Application Note, Aug. 1997, pp. 4-1 through 4-11, vol. AN9761, Intersil Corporation, U.S.A.

Mike Wong, "Designing a High Efficiency DC-DC Converter with the EL75XX," Intersil Application Note, Mar. 24, 1998, pp. 1-16, vol. AN1101, Intersil Corporation, U.S.A.

(Continued)

*Primary Examiner*—Adolf Berhane
(74) *Attorney, Agent, or Firm*—Squire Sanders & Dempsey, L.L.P.

(57) ABSTRACT

Embodiments of a current sensing circuit for a multi-phase DC-DC converter are disclosed. In one embodiment, an integrated circuit (IC) may be provided that has high- and low-side switch arrays being coupled to an output terminal as well as being coupled between high and low voltage terminals. The switch arrays may also include at least one bonding pad and at least one bonding wire. The IC may also include a driver coupled to the switch arrays for driving the switch arrays and a sensing circuit that coupled to the bonding pad for detecting a signal passing through the bonding wire.

15 Claims, 6 Drawing Sheets

U.S. PATENT DOCUMENTS

| | | |
|---|---|---|
| 2003/0218455 A1 | 11/2003 | Tai et al. |
| 2004/0036452 A1 | 2/2004 | Brooks et al. |
| 2004/0076024 A1 | 4/2004 | Liu et al. |
| 2004/0085789 A1 | 5/2004 | Lipcsei |
| 2004/0135566 A1 | 7/2004 | Isham |
| 2004/0189221 A1 | 9/2004 | Kurosawa et al. |
| 2006/0113979 A1* | 6/2006 | Ishigaki et al. .............. 323/282 |

OTHER PUBLICATIONS

"DC-DC Converter Tutorial," Maxim Integrated Products Application Note, Oct. 19, 2000, 10 pages, vol. 710, obtained from web site www.maxim-ic.com/an710, U.S.A.

"Building a Power Supply that Works," Maxim Integrated Products Application Note, Feb. 20, 2003, 10 pages, vol. 1897, obtained from web site www.maxim-ic.com/an1897, U.S.A.

* cited by examiner

CURRENT SENSING CIRCUIT FOR A MULTI-PHASE DC-DC CONVERTER

CROSS-REFERENCE TO RELATED APPLICATIONS

This application claims the benefit of U.S. Provisional Application No. 60/561,655 filed Apr. 12, 2004 which is incorporated by reference herein in its entirety.

TECHNICAL FIELD

The embodiments described herein generally relate to electronic circuits and more particularly relate to direct current to direct current (DC-DC) converters.

BACKGROUND

Electrical power for an integrated circuit (IC) may typically be supplied by one or more direct current (DC) sources. More particularly, today's large-scale high-speed digital processors typically require low voltages (e.g., Vdd), large currents (e.g., Idd), and a high through rate DC-DC converter for the power supply. Multi-phase DC-DC converter circuits are widely used for such applications. For high through rates and high efficiency, DC-DC converters typically need a driver and switching circuit such as a driver and metal-oxide semiconductor field-effect transistors built-in device called a "driver MOS" to help eliminate stray induction between the driver and the switching MOSFETs.

Usually, a current driving capacity of a single driver MOS may not be sufficient for use with a digital processor, so a multi-phase driver MOS circuit configuration is used to provide multi channel parallel operation. A voltage feedback from an output to each PWM generator produces stable DC output. Each driver MOS may also have an output current sensing and negative feedback loop. The current sensing feedback works to get all of driver MOS devices to share current equally. For such current sensing, many systems have been proposed.

Figure 1:
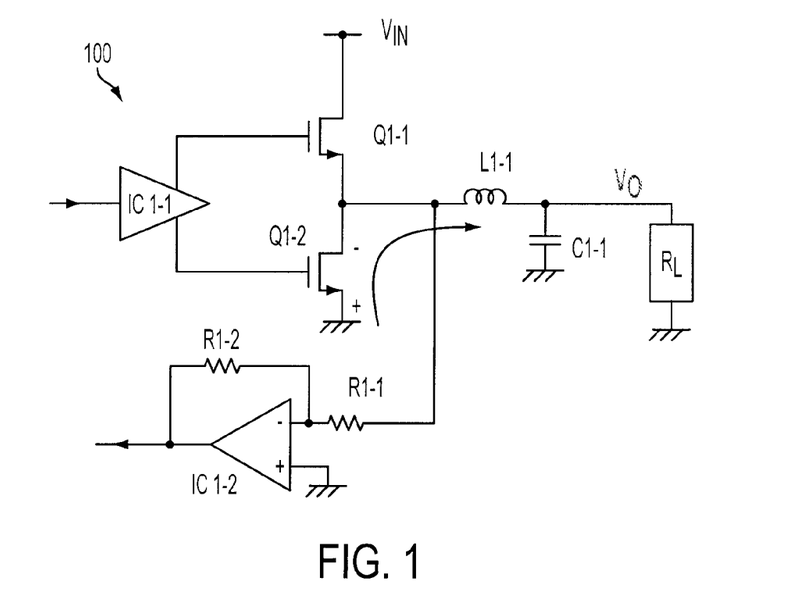
FIG. 1 is a schematic block diagram illustrating a current sensing technology that using low side MOSFET RDSON.
Figure 2:
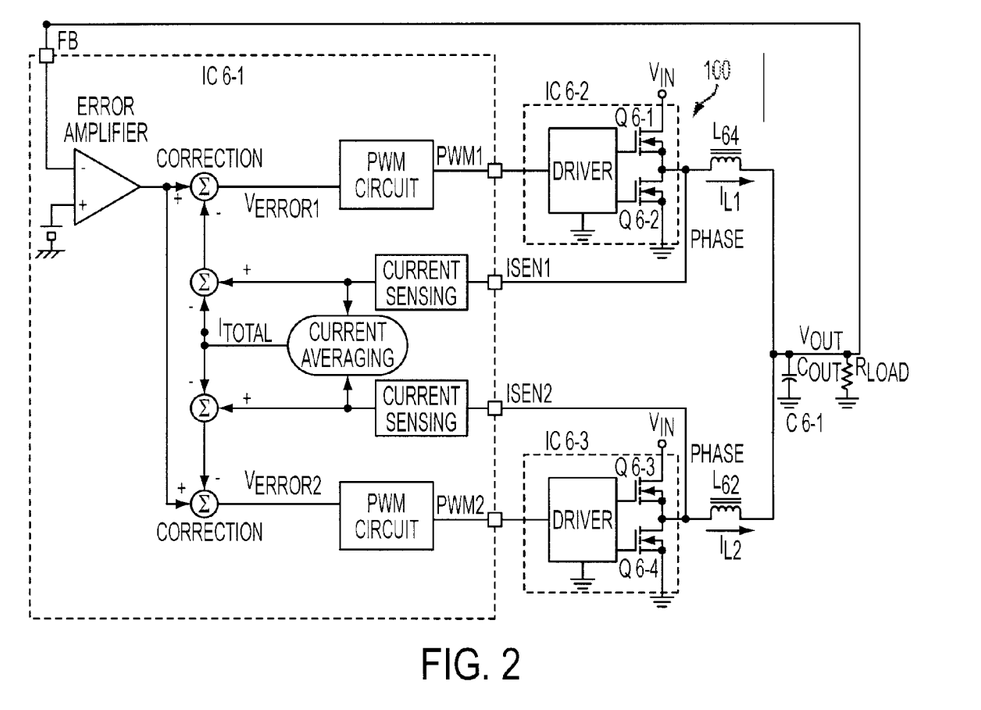
FIG. 2 is a schematic block diagram illustrating a conventional multi-phase DC-DC converter using the current sensing methodology shown in FIG. 1.

FIG. 1 illustrates a current sensing technology 100 that uses a low side MOSFET RDSON ("RDSON" meaning the on-state resistance that exists between the drain and source) as a sensing resistor. In the FIG. 1, the current flow through a low side switching MOSFET is monitored via the low side MOSFET RDSON. Such a system 100 may be useful for high efficiency operation and at low cost. However, such a system 100 must be carefully designed in order to account for RDSON deviation and temperature dependency. FIG. 2 illustrates a multi-phase DC-DC converter (in this example a two phase converter) using the current sensing methodology 100 shown in FIG. 1.

Figure 3:
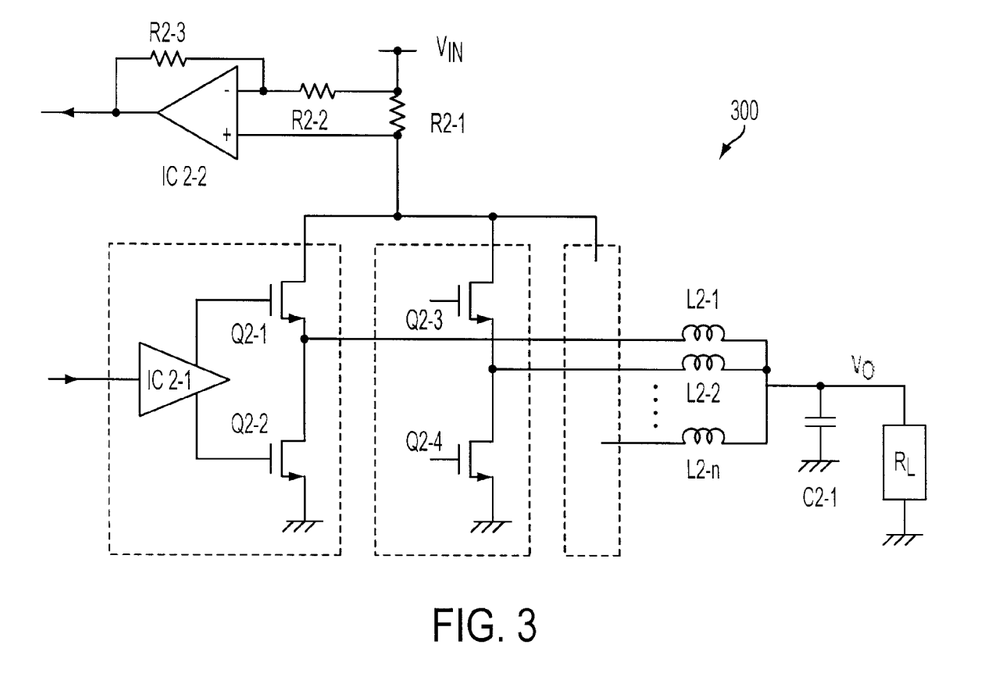
FIG. 3 is a schematic block diagram illustrating a current sensing technology using common serial resistor between a high side MOSFET and VIN.

FIG. 3 illustrates another current sensing technology 300 using common serial resistors between a high side MOSFET and VIN power rail. In the system 300 shown in FIG. 3, the common drain current is monitored using a resistor. This system may be effective for achieving good current matching for each driver MOS. However, drain line impedance in this system is extremely sensitive making efficiency very difficult under high current operation.

Figure 4:
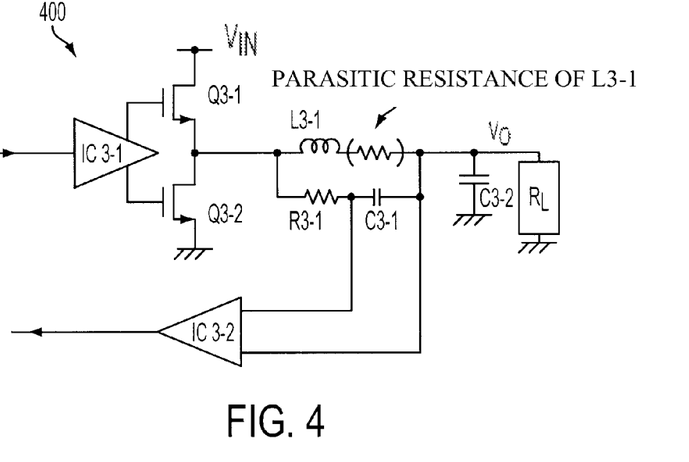
FIG. 4 is a schematic block diagram illustrating a current sensing technology using the parasitic resistance of an inductor.

FIG. 4 illustrates an additional current sensing technology 400 that uses the parasitic resistance of an inductor. In the FIG. 4, the current through to an inductor is monitored using the parasitic resistance of the inductor. This system 400 may have a good efficiency at a relatively low cost. However, careful design is required for such systems 400 in order to account for filter frequency and temperature dependency.

SUMMARY

Embodiments of a current sensing circuit for a multi-phase DC-DC converter are disclosed. In one embodiment, an integrated circuit (IC) may be provided that has high- and low-side switch arrays being coupled to an output terminal as well as being coupled between high and low voltage terminals. The switch arrays may also include at least one bonding pad and at least one bonding wire. The IC may also include a driver coupled to the switch arrays for driving the switch arrays and a sensing circuit that coupled to the bonding pad for detecting a signal passing through the bonding wire.

In one implementation, the detected signal may comprise current passing through the bonding wire. In another implementation, the detected signal may comprise voltage from both edges of bonding wire. The sensing circuit may comprise a second bonding wire coupled to the bonding pad. The switch arrays may comprise field-effect transistors (FETs) and, more particular, may comprise metal-oxide semiconductor FETs (MOSFETs). In one implementation, each switch array may comprise a plurality of MOSFETs coupled in parallel.

In one implementation, the bonding wire may be coupled between the low voltage power terminal and the bonding pad so that the signal detected by the sensing circuit passes between the low voltage power terminal and the bonding pad. In such an implementation, a source of the low-side switch array may be coupled to the bonding pad while a drain of the low-side switch array may be coupled to the output terminal. In another implementation, the high-side switch array may have a drain coupled to the high voltage terminal and a source coupled to the bonding pad with bonding wire being coupled between the bonding pad and the output terminal.

In another embodiment, a DC-DC converter may be provided having a pulse generator for generating pulses for a plurality of channels. Each channel may include a driver and high- and low-side switch arrays between the pulse generator and an output node. The switch arrays may also have at least one bonding pad and at least one bonding wire. The converter may further include a controller for controlling the pulse generator. The controller may have a feedback loop coupled to each channel for detecting a signal passing through the bonding wire of each channel. The sensing circuit may comprises a second bonding wire coupled to the bonding pad. In one implementation of the DC-DC converter, the switch arrays of the channels may comprise FETs, and even comprise a plurality of FETs coupled in parallel.

The bonding wire of at least one of the channels of the DC-DC converter may be coupled between a low voltage power terminal and the bonding pad so that the detected signal passes between the low voltage power terminal and the bonding pad. In one aspect, a source of the low-side switch array of the at least one channel may be coupled to the bonding pad and a drain of the low-side switch array of the at least one channel may be coupled to an output terminal of the channel that is coupled to the output node. In another aspect, the high-side switch array may have a drain coupled to the high voltage terminal and a source coupled to the bonding pad, wherein the bonding wire may be coupled between the bonding pad and an output terminal of the at least one channel. The DC-DC converter may include a second feedback loop for providing a second signal from output node to the controller.

In a further embodiment, a process may be afforded for providing feedback in a DC-DC converter. In this process, each of a plurality of channels may be sampled for a signal passing through a bonding wire of a switch array of the respective channel. The bonding wire may be coupled to a bonding pad of the switch array of the given channel. The sampled signals and may then be averaged to obtain an average signal that may then be used with the sampled signals to adjust the power provided to each channel. In one embodiment, each channel may have an output coupled to a common output node and the adjusting of the power provided to each channel may be further based on an error signal received from the output node.

DETAILED DESCRIPTION

In semiconductor fabrication, accurate die mounting location and bonding wire dimensions may be achieved. Driver MOS ICs typically use many bonding wires to help reduce the impedance and enhance high efficiency. The resistance of a bonding wire may be decided by wire length and wire diameter. Because there is generally little deviation, the resistance of bonding wires may be used as a current sensing resistor. These bonding wires may be used to help provide highly accurate current sensing in multi-phase DC-DC converted to help provide well balanced current sharing. Accordingly, the following embodiments and implementations of various aspects and features of a multi-phase DC-DC converter will be described.

Multi-Phase DC-DC Converter Architecture 500

Figure 5:
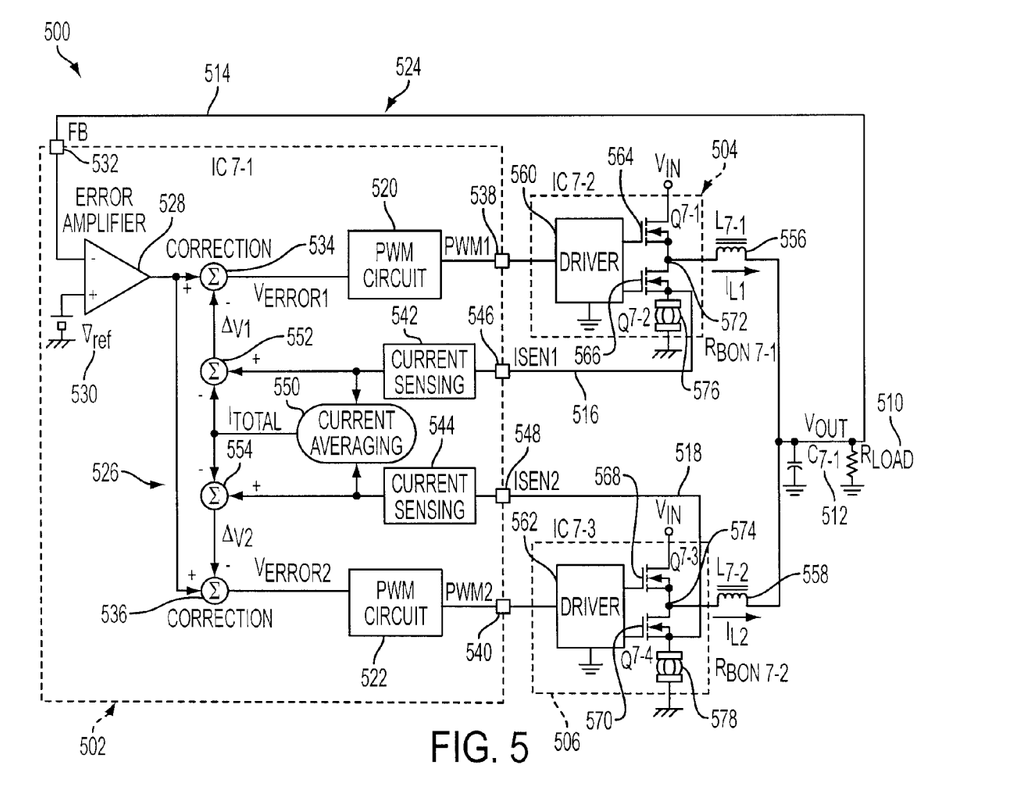
FIG. 5 is a schematic block diagram of a multi-phase DC-DC converter architecture 500 in accordance with an exemplary embodiment.

FIG. 5 is a schematic block diagram of a multi-phase DC-DC converter architecture 500 in accordance with an exemplary embodiment. The multi-phase DC-DC converter 500 may comprise a pulse width modulation (PWM) controller 502 and a plurality of driver and switch circuits 504, 506 (one for each power channel of the controller 502). While the embodiment shown in FIG. 5 is depicted as a two-phase converter, it should be understood that embodiments of the converter 500 may be implemented to support additional phases.

The PWM controller 502 may provide multiple signals, specifically synchronous PWM signals PWM1, PWM2 to the driver and switch circuits 504, 506 (each may also be referred to as a "driver-MOS" in various embodiments herein). Each driver and switch circuit 504, 506 may have an output coupled to one end of an associated inductor 556, 558. The other ends of the inductors 556, 558 may be coupled to a common output node 508 to permit development of an output signal VOUT that may be applied to a load (RLOAD) 510 and a load reservoir capacitor 512 (both load 510 and the load reservoir capacitor 512 may be referenced to a power supply rail (e.g., GND)). The VOUT signal may be fed back to the PWM controller 502 via a feedback line 514 (a feedback resistor may be included in the feedback line). The driver and switch circuits 504, 506 may each be coupled to the PWM controller 502 via corresponding current sense lines 516, 518 to provide current sensing signals ISEN1 ISEN2 to the PWM controller.

PWM Controller 502

The PWM controller 502 may include a plurality of PWM circuits 520, 522 for providing PWM signals PWM1, PWM2 to the driver and switch circuits 504, 506. The PWM controller may also include circuitry forming a voltage feedback loop 524 and a current feedback loop 526 for providing feedback control to the PWM circuits 520, 522 to regulate output voltage VOUT and control phase currents IL1 and IL2 (also referred to as channel currents).

Voltage Feedback Loop 524

The voltage feedback loop 524 may include an error amplifier 528 having a non-inverting output coupled to ground 530 (e.g., a reference voltage source) and an inverting input coupled to the feedback line 514 via feedback pin 532. With the voltage feedback loop 524, output voltage feedback VOUT may applied to the inverting input of the error amplifier and may drive the error amplifier output high or low, depending upon the output voltage in relation to reference voltage VREF. The amplifier output voltage is distributed among the PWM circuits 520, 522 and summed (via summing circuits 534, 536) with the associated current correction signals from the current feedback loop 526. The resultant voltage error signals VERROR1, VERROR1 are provided to their respective PWM circuits 520, 522.

Each PWM circuit 520, 522 may compare its associated voltage error signal VERROR1, VERROR2 to a corresponding comparison signal to adjust the duty ratio of the output PWM signal PWM1, PWM2 to maintain the node 508 inside prescribed parameters (e.g., a droop or gain parameter defining a fixed ratio amount that the voltage of VOUT decreases in response to increasing load current). In one exemplary implementation, each PWM circuit 520, 522 voltage error signal VERROR1, VERROR2 may be compared with a sawtooth ramp signal (that may be out-of-phase with the sawtooth ramp signals of the other PWM circuits). In such an implementation, the resulting duty cycle signals PWM1, PWM2 may determined by the movement of the associated correction voltage VERROR1, VERROR2 relative to the corresponding sawtooth ramp. The individual PWM signals PWM1, PWM2 may then be sent to their respective driver and switch circuit 516, 518 from PWM pins 538, 540 of the controller 502. The gate drivers 560, 562 may then switch their upper and lower MOSFETs in accordance to this PWM signal.

Current Feedback Loop 526

The current feedback loop 526 may help to keep the channel currents IL1, IL2 in balance. The current control loop 526 may include a current sensing circuit 542, 544 for each power channel of the controller 502. The current sensing circuits 542, 544 may be coupled to their associated current sense lines 516, 518 (via current sensing interfaces 546, 548) so that each current sensing circuit 542, 544 may receive a current feedback output signal (i.e., current sensing signals ISEN1, ISEN2) from its associated driver and switch circuit 504, 506 that may be proportional to the output current (i.e., IL1, IL2)

of respective power channel. As shown in the exemplary implementation of FIG. 5, current sensing interfaces 546, 548 may be coupled to a bonding pad of its associated driver and switch circuit (e.g., low side bonding pads 576, 578 (RBON7-1 and RBON7-2) as shown in FIG. 5) to obtain a current feedback signal ISEN1, ISEN2. In one implementation, current sensing signals may be sampled during the PWM off-time of the respective power channel. Current sensing circuits 542, 544 provide may be coupled to a current averaging circuit 550 that combines the current feedback signals ISEN1, ISEN2 to generate an average current reference signal ITOTAL relative to the total output current of the converter 500.

Average current reference signal ITOTAL may then be subtracted from the output feedback currents ISEN1, ISEN2 (via summing circuits 552, 554) to produce current correction signals ΔV1, ΔV2 for each power channel. The current correction signals ΔV1, ΔV2 help to keep each channel's output current contribution balanced relative to the other active channels. Each current correction signal may then subtracted from the error amplifier output (via summing circuits 534, 536) and fed to the individual channel PWM circuits 520, 522.

The following example provides an exemplary illustration of the operation of the current loop 526. Assume the voltage sampled from driver and switch circuit 506 is higher than that sampled from driver and switch circuit 504. In such an situation, ISEN2 current would be higher than ISEN1. When ISEN1 and ISEN2 are averaged they may represent the total output current of the converter 500. The reference current ITOTAL is then subtracted from the ISEN currents. This results in a positive offset for ΔV2 and a negative offset for AV1. These offsets may then be subtracted from the error amplifier signal and perform phase balance correction. The VERROR2 signal is reduced, while VERROR1 would be increased. PWM circuit 522 would then reduce its pulse width to lower the output current contribution (i.e., IL2), while PWM circuit 520 would increase its pulse width to raise the output current contribution (i.e., IL1).

Driver and Switch Circuits 504, 506

The driver and switch circuits 504, 506 may each include a driver 560, 562 and a pair of electronic power switching devices 564, 566, 568, 570 (also referred to as switches). Each driver 560, 562 may be coupled to a PWM pin 538, 540 of an associated power channel of the PWM controller 102 so that each driver receives a PWM signal (e.g., PWM signals PWM1, PWM2) provided by its associated PWM circuit 520, 522. The drivers 560, 562 may control the turn-on and turn-off of its associated pair of electronic power switching devices 564, 566, 568, 570. For example, each driver 560, 562 may generate an upper gate switching signal provided to the control terminal (e.g., gate) of its associated upper (or high side) switch 564, 568 and a lower gate switching signal LGATE provided to the control terminal of its associated lower (or low side) switch 566, 570.

In one implementation, the switching devices 564, 566, 568, 570 may comprise N-channel metal-oxide semiconductor field-effect transistors (MOSFETs) having their drain-source current paths coupled in series between a pair of power supply rails (e.g., VIN and ground (GND)). With respect to driver and switch circuit 504 (i.e., a "driver-MOS"), the drain of switch 564 may be coupled to the source of switch 566 at a node 572 that is coupled to one end of inductor 556. Similarly, the drain of switch 568 of driver and switch circuit 506 may be coupled to the source of switch 570 at a node 574 that is coupled to one end of inductor 558. In accordance with one embodiment, it should be understood that switches of the drain and switch circuits may possible be implemented, for example, as NPN transistors, with Base substituted for Gate, Emitter for Source, and Collector of Drain.

Current Sensing Architectures 600, 700

Figure 6:
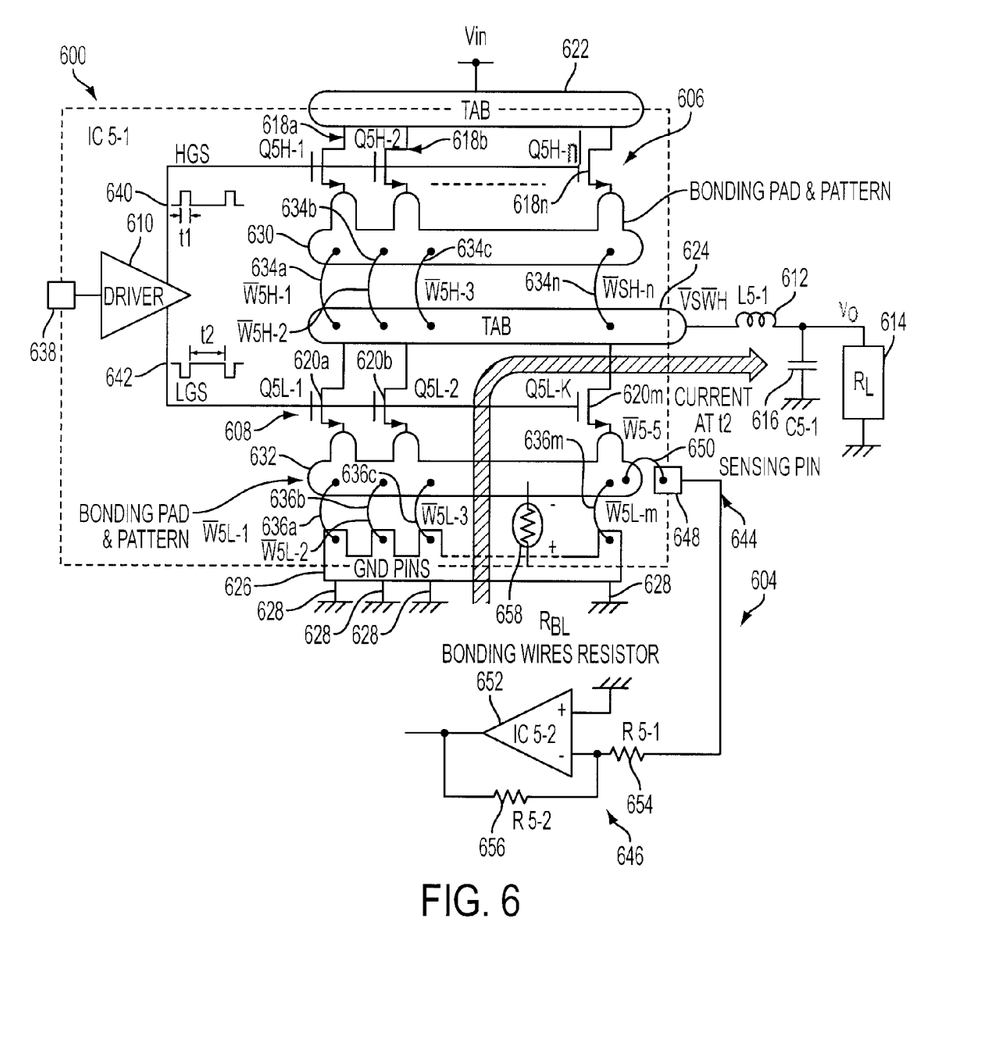
FIG. 6 is a schematic block diagram of an illustrative low side current sensing architecture 600 in accordance with an exemplary embodiment.
Figure 7:
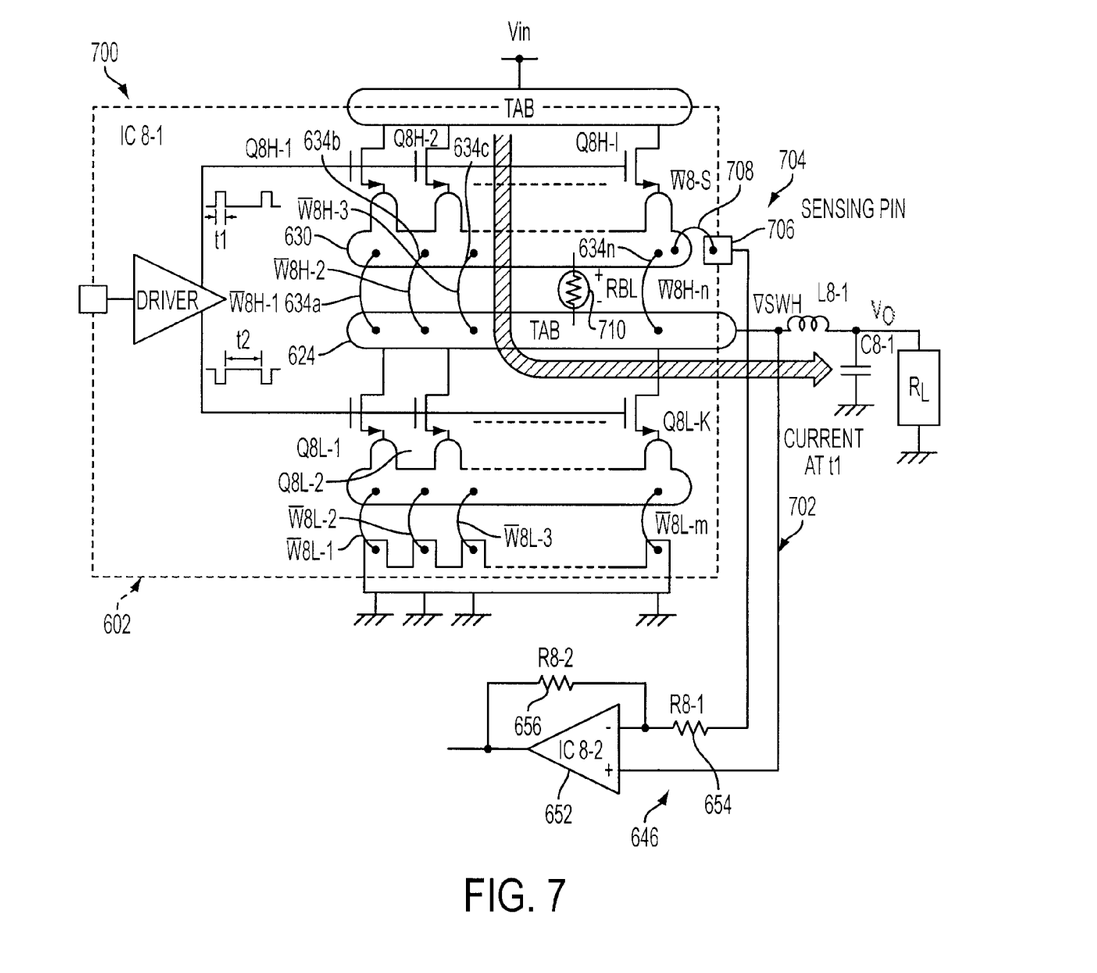
FIG. 7 is a schematic block diagram of an illustrative high side current sensing architecture in accordance with an exemplary embodiment.

FIGS. 6 and 7 illustrate two exemplary current sensing architectures 600, 700 that may be implemented in embodiments of a DC-DC converter 500 to provide current sensing signals ISEN1, ISEN2 to the PWM controller 502 from the driver and switch circuits 504, 506.

In particular, FIG. 6 is a schematic block diagram of an exemplary embodiment of a current sensing architecture 600 comprising a driver and switch circuit 602 and a low side current sensing circuit 604 coupled to the driver and switch circuit 602 for monitoring current flow. Similarly, FIG. 7 is a schematic block diagram of an exemplary embodiment of a current sensing architecture 700 comprising a driver and switch circuit 602 and a high side current sensing circuit 702 coupled to the driver and switch circuit 602. Since the current sensing architectures 600, 700 shown in FIGS. 6 and 7 are similar, they will be described in further detail together (with differences therebetween noted). It should be understood that embodiments of the DC-DC converter 500 may be implemented to include either or both of the current sensing architectures 600, 700 shown in FIGS. 6 and 7.

Driver and Switch Circuit 602

In general, the driver and switch circuit 602 (e.g., driver and switch circuits 504 and/or 506) may comprise high- and low side switch arrays 606, 608 and a driver circuit 610 (or "driver") for controlling the turn-on and turn-off of the switch arrays 606, 608. The driver and switch circuit 602 may be implemented as an integrated circuit (IC) and may be fabricated, for example, using a multi-chip package technology.

An output of the driver and switch circuit 602 may be coupled to one end of an inductor 612 (load L). The other end of the inductor 612 may be coupled in parallel to a load 614 (e.g., resistor RLOAD or RL) and a load reservoir capacitor 616 (e.g., a ripple filter capacitor) so that a stable DC output signal VO (i.e., VOUT) developed by the inductor 612 may be applied to the load RL 612. As shown in FIG. 6, both the load RL 614 and the load reservoir capacitor 616 may be referenced to ground.

High- and Low Side Switch Arrays 606, 608

The high- and low side switch arrays 606, 608 may be coupled in series between a pair of power supply rails (power supply VIN and ground (GND)) and to an output drain VSWH. Each switch array 606, 608 comprises one or switching devices (or "switches"). In the embodiment depicted in FIG. 6, each switch array 606, 608 may comprise a plurality of parallel switches 618a, 618b, 618n, 620a, 620b, 620m (e.g., switch 1, ... switch n/m). In one implementation, the switches may comprise field-effect transistors (FETs), and more particularly, the switches may comprise N-channel metal-oxide semiconductor field-effect transistors (MOSFETs) having their drain-source current paths coupled in series between the VIN and ground power supply rails. In such an implementation, the sources of the high side MOSFETs 618a, 618b, 618n may be coupled to the drains of the low side MOSFETs and the sources of the low side MOSFETs 620a, 620b, 620m may be coupled to ground.

The driver and switch circuit 602 may include a plurality of interfaces adapted for coupling the high and low side switch arrays 606, 608 to external drains or ground. For example, the driver and switch 602 may include a drain side interface 622 for coupling for coupling the driver and switch circuit 602 to the power supply VIN, an output drain interface 624 for coupling the driver and switch circuit 602 to an output drain, and a ground interface 626 for coupling the driver and switch circuit 602 to ground. In an implementation where the driver and switch circuit 602 comprises an integrated circuit (IC) and the switches 618a, 618b, 618n, 620a, 620b, 620m of the high- and low side switch arrays 606, 608 comprise N-channel MOSFETs, the substrates of N-channel MOSFETs may be connected to drain. As a result, the drain/ground interfaces of the driver and switch circuit 602 in such an implementation may comprise (at least in part) three exposed tabs: a driver IC tab 626 (or "driver tab") coupled to ground (via a plurality of ground (GND) pins 628), a high side tab 622 coupled to drain (i.e., power terminal VIN) and a low side tab 624 coupled to drain (i.e., output terminal VSWH of the driver and switch circuit 602).

The drains of the high side switches 618a, 618b, 618n may be coupled to the high side tab 622 (and thereby coupled to power terminal VIN) and the drains of the low side switches 620a, 620b, 620m may be coupled to the low side tab 624 (and thereby coupled to output terminal VSWH). The sources of the high side switches 618a, 618b, 618n may each be coupled to a high side bonding pad 630 while the sources of the low side switches 620a, 620b, 620m may each be coupled to a low side bonding pad 632. In one implementation, the sources of the switches 618a, 618b, 618n, 620a, 620b, 620m may be coupled to the respective bonding pads 630, 632 using a wide metal pattern. The high side bonding pad may be coupled to the low side tab by a plurality of internal wire bonding connections 634 ("bonding wires") and thereby couple the sources of the high side switches 618a, 618b, 618n to the drains of the low side switches 620a, 620b, 620m. As shown in illustrative implementation of FIG. 6, the low side tab 624 may be positioned adjacent the high side bonding pad 630 to help facilitate their easier connection to the internal bonding wires 634 and to help achieve low connection impedance therebetween. Similarly, the low side bonding pad 632 may also be coupled to the driver tab 626 by a plurality of internal wire bonding (e.g., bonding wires 636a, 636b, 636c, . . . 636m) connections thereby couple the sources of the low side switches 620a, 620b, 620m to ground.

Driver Circuit 610

The driver circuit 610 of the driver and switch circuit 602 may include an input 638 adapted for receiving a pulse width modulation (PWM) signal from a PWM signal generator (e.g., PWM circuits 520 or 522). The driver 610 may control the turn-on and turn-off of the high side- and low side switches 618a, 618b, 618n, 620a, 620b, 620m of the switch arrays 606, 608.

In an embodiment where the switches comprise FETs, and more particularly, N-channel MOSFETs, a gate terminal of each high side MOSFET 618a, 618b, 618n may be coupled to an high side output 640 of the driver 610 to receive an high gate switching signal HGS provided by the driver 610. Similarly, the gate terminal (or "control terminal") of each low side MOSFET 620a, 620b, 620m may be coupled to a low side output 642 of the driver 610 to receive a lower gate switching signal LGS provided by the driver 610.

Current Sensing Circuit 604, 702

The current sensing circuit 604, 702 monitors current flow and provides current feedback signals to the PWM controller. A current sensing circuit may comprise a sensing interface C244, 704 and a current sense amplifier 646 that receives a reference current (e.g., ISEN1 or ISEN2) from the sensing interface.

Sensing Interface 644, 704

The sensing interface 644, 704 may be coupled to a bonding pad of a driver and switch circuit 602 to detect reference current ISEN (i.e., ISEN1 or ISEN2 in FIG. 5). The sensing interface 644, 704 may comprise a tab 648, 706 having a sensing pin that is coupled to a bonding pad of the driver and switch circuit 602 by a bonding wire 650, 708 (or "sensing bonding wire"). In the low side current sensing architecture 600 depicted in FIG. 6, the sensing bonding wire 650 may be coupled to the low side bonding pad 632 (i.e., between the sources of the low side switches/MOSFETs 620a, 620b, 620m and the driver tab/ground 626).

In the high side current sensing architecture 700 depicted in FIG. 7, the sensing bonding wire 708 may be coupled to the high side bonding pad 630 (i.e., between the sources of the high side switches/MOSFETs 618a, 618b, 618n and the low side tab/output terminal VSWH 624).

Current Sense Amplifier 646

The current sense amplifier 646 of a current sensing circuit 604, 702 may comprise an inverting amplifier circuit. The inverting amplifier circuit may include an amplifier 652 with its inverting input coupled to the sensing pin 648, 706 (with input resistance/resistor 654 interposed therebetween) to receive reference output ISEN (i.e., ISEN1 or ISEN2 in FIG. 5), its non-inverting input coupled to ground, and its output fed back through feedback resistor 656. Output of the amplifier (i.e., VERROR1 or VERROR2 in FIG. 5) may be provided for use in remainder of a current feedback loop of a PWM controller (see FIG. 5).

Integrated Circuit Pin Arrangement

Figure 8:
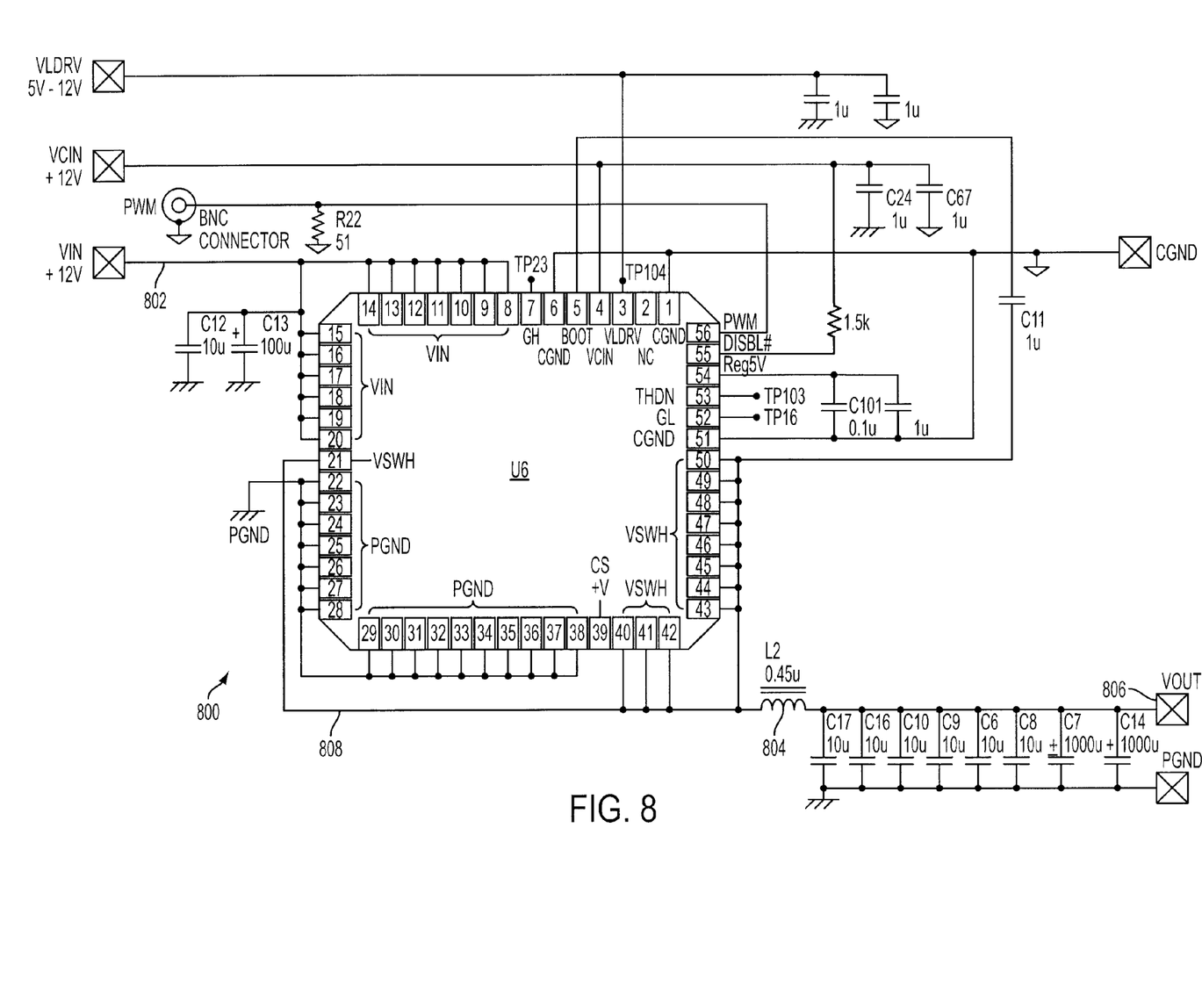
FIG. 8 is a schematic block diagram on an exemplary pin arrangement for an illustrative driver and switch circuit in accordance with an embodiment.

FIG. 8 is a schematic block diagram on an exemplary pin arrangement for an illustrative driver and switch circuit 800 in accordance with an embodiment. As shown in FIG. 8, a driver and switch circuit may include a plurality of pins for coupling to a power supply rail VIN, a plurality of pins coupled to an output (i.e., VSWH) coupled to inductor 804 (and VOUT 806), and a plurality of pins coupled to a ground (PGRND) rail 808. In an embodiment where the driver and switch circuit 800 is implemented following the architecture 600 set forth in FIG. 6, the ground pins (e.g., pins 22-38) coupled to the PGRND 808 may be coupled to the sources of the low side switches/MOSFETs using bonding wires. CS pin (e.g., pin 39) may comprise a current sensing pin connected to a source bonding pad using an individual bonding wire.

Operation of Current Sensing Architectures 600, 700

As shown by the timing diagrams in FIGS. 6 and 7, the driver 610 may drive the high side switches to ON during period t1 (via signal HGS) and then drive the low side switches to ON during period t2 (via signal LGS). In the exemplary implementations shown in FIGS. 5, 6 and 7, the output voltage VO (VOUT) may typically be between about four times to about ten times smaller than VIN voltage. As a result, period t1 may be between about four times to about ten times smaller than the total driving time: period t1+period t2. As a result, duty may be set by the PWM controller to between about 10% and about 25%.

More specifically, VO (i.e., VOUT) may be described as follows:

$$VIN-VO=L\, di/dt1;\text{ and}$$

$$VO=L\, di/dt2;$$

where:

L=load RL.

Duty may be described as VO/VIN, therefore:

$$Duty=VO/VIN=dt1/(dt1+dt2).$$

Current Sensing Architecture 600

With reference to the current sensing architecture 600 depicted in FIG. 6, in period t1, the high side switches/MOS- FETs 618*a*, 618*b*, 618*n* are ON while the low side switches/ MOSFETs 620*a*, 620*b*, 620*n* are OFF so that current Id (during period t1) flows from power supply VIN to high side tab 622 to high side switches/MOSFETs 618*a*, 618*b*, 618*n* (drains to sources) to bonding wires 634*a-n* to low side tab 624 to inductor 612 to load RL 614.

Then in period t2, the high side switches/MOSFETs 618*a*, 618*b*, 618*n* are OFF and the low side switches/MOSFETs 620*a*, 620*b*, 620*n* are ON. Since the current keeps flowing continuously (because of the inductance of inductor 612), current Id during period t2 flows from ground (GND) to bonding wires 636*a-m* to low side switches/MOSFETs 620*a*, 620*b*, 620*n* (sources to drains) to low side tab 624 to inductor 612 to load RL 614.

The total resistance (RBL 658) of the low side bonding wires 636*a-m* may be calculated as the sum of the resistances (RWx) of each of the low side bonding wires 636*a-m* divided by the total number of low side bonding wires as follows:

$$RBL=1/(1/RW5L\text{-}1+1/RW5L\text{-}2+\ldots+1/RWSL\text{-}m);$$

where:
RBL=total resistance of the low side bonding wires 636*a-m*;
$1/(1/RW5L\text{-}1+1/RW5L\text{-}2+\ldots+1/RWSL\text{-}m)$=the resistances of all of the low side parallel bonding wires 636*a-m*;

The voltage (Id×RBL) may be monitored by the low side sensing pin 648 (coupled to the low side bonding pad 632 and thereby to the sources of the low side switches/MOSFETs 620*a*, 620*b*, 620*n*. The gain of the current sense amplifier 646 may be calculated as:

Gain=(Resistance of input resistor 654 (i.e., resistor (R5-2)))/(Resistance of feedback resistor 656 (i.e., resistor (R5-1))).

It should be noted that in the illustrative implementation shown in FIG. 6, the DC-DC converter output voltage VO (i.e., VOUT) may typically be found to be approximately four to ten times smaller than voltage VIN. As a result, period t1 may be four to ten times shorter (i.e., smaller) than the total driving time, period t1+period t2. As a result, in one embodiment, duty may be set to between about 10% and about 25%.

Current Sensing Architecture 700

In the implementation 700 depicted in FIG. 7, the resistance of the bonding wires 634 between the sources of the high side switches/MOSFETs coupled to the high side bonding pad 630 and the low side tab 624 may be used to monitor the current flow from power supply VIN to the high side switches/MOSFETs during the period t1. In this implementation 700, the signal between the sensing pin 706 and output signal VSWH may be detected by the amplifier 646 and amplified (by the ratio of the resistance of the feedback resistor 656 divided by the resistance of the input resistor 654) to output a current feedback signal (e.g., ISEN1 or ISEN2) for receipt by a PWM controller.

Accordingly (and similar to the above description regarding to FIG. 6), the total resistance (RBL 710) of the high side bonding wires 634*a-n* in the current sensing architecture 700 depicted in FIG. 7 may be calculated as the sum of the resistances (RWx) of each of the high side bonding wires 634*a-n* divided by the total number of high side bonding wires as follows:

$$RBL=1/(1/RW8L\text{-}1+1/RW8L\text{-}2+\ldots+1/RWSL\text{-}n);$$

where:
RBL=total resistance of the high side bonding wires 634*a-n*;
$1/(1/RW8L\text{-}1+1/RW8L\text{-}2+\ldots+1/RW8L\text{-}n)$=the resistances of all of the high side parallel bonding wires 634*a-n*;

The voltage (Id×RBL) may be monitored by the high side sensing pin 710 (coupled to the high side bonding pad 630 and thereby to the sources of the high side switches/MOSFETs 618*a*, 618*b*, 618*n*. The gain of the current sense amplifier 646 may be calculated as:

Gain=(Resistance of input resistor 654 (i.e., resistor (R5-2)))/(Resistance of feedback resistor 656 (i.e., resistor (R5-1))).

Current Feedback Loop 526

Turning now to FIG. 5 (for both implementations 600, 700 discussed above), voltage VOUT may be determined by the voltage feedback loop (VOUT to feedback line 514 to feedback pin 532 to error amplifier 528 to PWM circuits 520, 522 to drivers 560, 562 to inductors 556, 558 and back to VOUT). Current sharing works secondarily to move one VOUT slightly higher for one channel and slightly lower to the other channel to achieve the same values for ISEN1 and ISEN2 value.

The current correction circuit of the current feedback loop 526 may produce correction signals that may be calculated as follows:

$$\Delta V1=(Id1)\times(RBL1)-((Id1)\times(RBL1)+(Id2)\times(RBL2))/2;$$
and $$\Delta V2=(Id2)\times(RBL2)-((Id1)\times(RBL1)+(Id2)\times(RBL2))/2=-\Delta V1.$$

where:
Id1 is current related to the monitored power channel for driver and switch circuit 504;
Id2 is current related to the monitored power channel for driver and switch circuit 506;
RBL1=total resistance of the designated side bonding wires (i.e., high or low bonding wires depending on whether architecture 600 or 700 is implemented) of driver and switch circuit 504; and
RBL2=total resistance of the designated side bonding wires (i.e., high or low bonding wires depending on whether architecture 600 or 700 is implemented) of driver and switch circuit 506.

Therefore, $$VERROR1=\Delta(VOUT-VREF)-\Delta V1;\text{ and}$$

$$VERROR2=\Delta(VOUT-VREF)-\Delta V2=\Delta(VOUT-VREF)+\Delta V1.$$

These error signals may be translated to the PWM circuits 520, 522 to generate period t1, period t2 to drive the pulses for the high- and low side switches/MOSFET. To achieve good current sharing, the total negative feedback loop may make VOUT=VREF and ΔV1=zero.

Thus, in accordance with various embodiments described above, a well balanced two-driver MOS IC may be capable of driving almost the same current to the load RL so that the maximum driving current of the system may be two times of the maximum driving current of a driver MOS IC. Each Driver MOS IC may consume the same amount of power and may produce the same amount of heat while being able to avoid thermal concentration on the PCB.

Thus, as previously mentioned, there is generally little deviation in bonding wire resistance and, as a result, the resistance of the bonding wires may be utilized for current to help provide highly accurate current sensing in multi-phase DC-DC converted to help provide well balanced current sharing. There are several reasons why the deviation between bonding wire resistances may be so low. First, the IC fabrication process provides excellent control over the length and diameter of bonding wires so that there is less a 10% deviation in length and diameter. Second, driver MOS ICs typically need numerous bonding wires between the low side MOS source(s) and GND. For example, as depicted in the driver-MOS implementation shown in FIG. 8, there are 17 bonding wires coupled to GND. As a result, if the lengths and diameters of each of N wires have random deviations, the total deviation will be reduced to $\sqrt{N}$. Third, if the GND pins are equally allocated to two sides of the IC, then the length deviations between these orthogonally located groups of wires may be further reduced. As a result of these advantages, a bonding wire connected a driver-MOS Source may monitor the voltage across the bonding wires when the period of the low side MOSFET is ON and the current flow from GND to load "L" (e.g., as shown in FIG. 6). In multi-phase operation, as shown in FIG. 5, the sensed voltage from each driver-MOS may be compared to each other in order to provide feedback control for increasing or decreasing the output voltages slightly (and thereby to achieve the same monitored voltage). In such an implementation, the driving currents IL1 and IL2 are detected as the voltage drop of: IL1×RBON7-1 (i.e., resistance of bonding wires 570) and IL2×RBON7-2 (i.e., resistance of bonding wires 572). Using resistance of bonding wire, the resistances of the bonding wires 570, 572 (i.e., RBON7-1 and RBON7-2) have almost same value—even if the driver and switch circuits 504, 506 are fabricated in different IC lots.

While various embodiments have been described above, it should be understood that they have been presented by way of example only, and not limitation. Thus, the breadth and scope of an embodiment should not be limited by any of the above described exemplary embodiments, but should be defined only in accordance with the following claims and their equivalents.

What is claimed:

1. An integrated circuit, comprising:
    a high-side switch array coupled through a first bonding wire and a first bonding pad between a high-voltage terminal and an output terminal,
    a low-side switch array coupled through a second bonding pad and a second bonding wire between a low-voltage terminal and the output terminal;
    a driver coupled to the switch arrays for driving the switch arrays; and
    a current sensing circuit comprising at least one of:
        a high-side sensing circuit coupled to the first bonding pad to detect a signal passing through the first bonding wire wherein:
            a first terminal of the first bonding wire is coupled through a first resistor to an inverting input of a first amplifier;
            a second terminal of the first bonding wire is coupled to the noninverting input of the first amplifier, and
            an output of the first amplifier is coupled through a second resistor to the noninverting input of the first amplifier; and
        a low-side sensing circuit coupled to the second bonding pad to detect a signal passing through the second bonding wire wherein:
            a first terminal of the second bonding wire is coupled through a third resistor to an inverting input of a second amplifier;
            a noninverting input of the second amplifier is coupled to ground; and
            an output of the second amplifier is coupled through a fourth resistor to the noninverting input of the second amplifier.

2. The integrated circuit of claim 1, wherein the switch arrays comprise field-effect transistors (FETs).

3. The integrated circuit of claim 2, wherein the FETs comprise metal-oxide semiconductor FETs (MOSFETs).

4. The integrated circuit of claim 3, wherein each switch away comprises a plurality of MOSFETs coupled in parallel.

5. The integrated circuit of claim 1, wherein the second bonding wire is coupled between a low voltage power terminal and the second bonding pad so that the signal detected by the sensing circuit passes between the low voltage power terminal and the second bonding pad.

6. The integrated circuit of claim 2, wherein a source of the low-side switch away is coupled to the second bonding pad and a drain of the low-side switch array is coupled to the output terminal.

7. The integrated circuit of claim 2, wherein the high-side switch away has a drain coupled to the high voltage terminal and a source coupled to the first bonding pad, wherein the first bonding wire is coupled between the first bonding pad and the output terminal.

8. A DC-DC converter, comprising:
    a pulse generator for generating pulses for a plurality of channels;
    each channel having a driver and high- and low-side switch arrays coupled between the pulse generator and an output node, wherein:
        the high-side switch array is coupled through a first bonding wire and first bonding pad between a high-voltage terminal and the output node, and
        the low-side switch array is coupled through a second bonding pad and a second bonding wire between a low-voltage terminal and the output node;
    a current sensing circuit comprising:
        a high-side sensing circuit coupled to the first bonding pad to detect a signal passing through the first bonding wire wherein:
            a first terminal of the first bonding wire is coupled through a first resistor to an inverting input of a first amplifier;
            a second terminal of the first bonding wire is coupled to the noninverting input of the first amplifier, and
            an output of the first amplifier is coupled through a second resistor to the noninverting input of the first amplifier; and
        a low-side sensing circuit coupled to the second bonding pad to detect a signal passing through the second bonding wire wherein:
            a first terminal of the second bonding wire is coupled through a third resistor to an inverting input of a second amplifier;
            a noninverting input of the second amplifier is coupled to ground; and
            an output of the second amplifier is coupled through a fourth resistor to the noninverting input of the second amplifier; and
    a controller for controlling the pulse generator, the controller having a feedback loop coupled to each channel for detecting a signal passing through the respective bonding wire of each channel.

9. The DC-DC converter of claim 8, wherein the switch arrays comprise field-effect transistors (FETs).

10. The DC-DC converter of claim 9, wherein each switch array comprises a plurality of FETs coupled in parallel.

11. The DC-DC converter of claim 8, wherein the second bonding wire of at least one of the channels is coupled between a low voltage power terminal and the second bonding pad so that the detected signal passes between the low voltage power terminal and the second bonding pad.

12. The DC-DC converter of claim 11, wherein a source of low-side switch away of the at least one channel is coupled to the second bonding pad and a drain of the low-side switch array of the at least one channel is coupled to an output terminal of the channel that is coupled to the output terminal.

13. The DC-DC converter of claim 12, wherein the high-side switch away of a second channel has a drain coupled to the high voltage terminal and a source coupled to the first bonding pad, wherein the first bonding wire is coupled between the first bonding pad and an output terminal of the second one channel.

14. The DC-DC converter of claim 8, wherein the high-side switch away of at least one channel has a drain coupled to a high voltage terminal and a source coupled to the first bonding pad of the at least one channel, wherein the first bonding wire is coupled between the first bonding pad and a output terminal of the at least one channel.

15. The DC-DC converter of claim 8, further comprising a second feedback loop for providing a second signal from output node to the controller.

* * * * *